United States Patent [19]

Sperry et al.

[11] Patent Number: 4,804,110
[45] Date of Patent: Feb. 14, 1989

[54] APPARATUS, METHOD AND ARTICLE FOR APPLYING A MELTED ADHESIVE

[75] Inventors: Charles R. Sperry, 113 Clinton St., Springfield, Vt. 05156; Paul J. Bladyka, Chester, Vt.

[73] Assignee: Charles R. Sperry, Springfield, Vt.

[21] Appl. No.: 817,067

[22] Filed: Jan. 8, 1986

[51] Int. Cl.$^4$ .............................................. B67D 5/62
[52] U.S. Cl. .................................... 222/56; 222/63; 222/146.5; 222/146.6
[58] Field of Search .................. 222/54, 61, 63, 56, 222/146.5, 146.6, 146.2, 146.1, 263; 219/230; 401/2

[56] References Cited

U.S. PATENT DOCUMENTS

| | | | |
|---|---|---|---|
| 3,285,475 | 11/1966 | Phillips . | |
| 3,318,481 | 5/1967 | Phillips et al. | 222/63 X |
| 3,377,012 | 4/1968 | Cushman | 222/146.5 X |
| 3,470,113 | 9/1969 | Baxmann et al. | 260/2.5 |
| 3,485,417 | 12/1969 | Cocks | 222/146 |
| 3,612,457 | 10/1971 | Ruskin | 222/146.5 |
| 3,653,552 | 4/1972 | Ash | 222/146.5 |
| 3,744,921 | 7/1973 | Weller et al. | 222/146.5 X |
| 4,032,046 | 6/1977 | Elliott et al. | 222/146.5 |
| 4,059,466 | 11/1977 | Scholl et al. | 156/78 |
| 4,059,714 | 11/1977 | Scholl et al. | 428/310 |
| 4,090,643 | 5/1978 | Wilkinson, Jr. et al. | 222/146.5 |
| 4,153,180 | 5/1979 | Fernique | 222/61 X |
| 4,163,037 | 7/1979 | Niznik | 264/54 |
| 4,314,655 | 2/1982 | Stirnweiss et al. | 222/146.5 |
| 4,396,529 | 8/1983 | Price et al. | 252/307 |
| 4,493,972 | 1/1985 | Steinel et al. | 219/230 |
| 4,523,705 | 6/1985 | Belanger et al. | 222/146.5 X |
| 4,561,569 | 12/1985 | Dziki | 222/146.5 |
| 4,613,062 | 9/1986 | Walter et al. | 222/146.2 |
| 4,621,748 | 11/1986 | Dziki | 222/146.5 |

OTHER PUBLICATIONS

Article: "Crosslined PE Foam Sheet: New Continuous Process Arrives" by: Carl Kirkland in: Plastics Technology, Nov. 1980, pp. 89–92.

*Primary Examiner*—Joseph J. Rolla
*Assistant Examiner*—Nils E. Pedersen
*Attorney, Agent, or Firm*—St. Onge Steward Johnston & Reens

[57] ABSTRACT

A dispenser is described for extruding a hot melt adhesive obtained by melting a rod of adhesive in a normally closed pressurized melting chamber. The rod is supplied from a remotely located spool through a flexible conduit to an inlet of the dispenser. A seal is placed at the inlet and is cooled by a flow of air so as to maintain the shape of the rod at the seal, prevent its deformation, and inhibit the leakage of melted adhesive back through the seal. A friction drive is used in the vicinity of the spool to push the rod into the melting chamber. A movable section is provided for the melting chamber to absorb expansion of the melted adhesive and a sensor is used to inhibit feeding of the rod when the chamber section expands and enable feeding when it is in a contracted position. A foamable adhesive rod is described wherein an unblown foaming agent is incorporated in the rod and activated in the melting chamber of the dispenser. Several embodiments are described.

32 Claims, 5 Drawing Sheets

APPARATUS, METHOD AND ARTICLE FOR APPLYING A MELTED ADHESIVE

FIELD OF THE INVENTION

This invention generally relates to an apparatus, method and article for applying melted adhesive to surfaces in fastening processes such as the sealing of shipping cartons, manufacture of shoes and the like. More specifically this invention relates to an article for and the application of a meltable adhesive in a foamed form to surfaces.

BACKGROUND OF THE INVENTION

Devices and techniques for applying hot melt adhesives are well known in the art. Typically a thermoplastic adhesive in a solidified form is used such as made of polyolefins, copolymers, polyesters or polyamides. These adhesives are applied in a rod form to the inlet of a dispenser having a heated melting chamber in which the adhesive is melted and then dispensed from an outlet onto a surface where the solidifying material serves as an adhesive. See for example. U.S. Pat. No. 4,032,046 to Elliott et al.

This patent is typical of the techniques used to dispense hot melt adhesive in that a hand-holdable dispenser gun is provided into which a rod of thermoplastic adhesive is fed by wheels which together with a drive motor present a bulky and heavy structure that is mounted on the dispenser. A mechanism is provided to sufficiently retract the rod from the dispenser to create a void that absorbs the expansion of melted adhesive as well as avoids excessive pressurization of the chamber leading to leakage during idling. A ball valve is located in the outlet to prevent leakage. Similar dispensers are shown and described in U.S. Pat. Nos. 3,285,475 to Phillips; 3,612,357 to Ruskin which describes a manually activated rod drive; 4,090,643 to Wilkinson et al wherein a preformed adhesive rod is advanced by way of a pneumatically activated piston.

The retraction mechanism adds complexity and with the gun mounted motor drive creates a bulky dispenser that can easily become tiresome to use. The partial retraction of the rod from the melting chamber tends to cause fouling with melted and then solidified adhesive, tending to clog the dispenser which then requires expensive and time consuming overhaul. Frequently, melted adhesive flows back along space between the rod and the dispenser and then solidifies to make it very hard to feed the rod, particularly when a manual advancing force is used. In case of a motor drive for the rod the increased resistance from the solidified "melt-back" tends to cause excessive compression of the rod which deforms, thus increasing melt-back and subsequent fouling. Another common problem encountered is caused by temperatures at the inlet to the melting chamber that are above the softening temperature of the rod. Rod softening makes it more difficult to push the rod into the melting chamber, particularly when excessive resistance is encountered due to melt-back.

Techniques have been proposed to inhibit back flow of melted adhesive that tends to solidify between the rod and the dispenser and also maintain the strength of the rod. In U.S. Pat. No. 3,285,475 forced air cooling is applied to cooling discs mounted on a barrel through which the rod is fed to be melted. The cooling air is generally applied to the entry part of the barrel so that the transition zone of the rod from solid to a melted state is likely to be elongated. In such technique, the force required to push the rod into the melting chamber still tends to increase with usage as melted adhesive gradually creeps back towards the inlet, particularly each time after the dispenser is turned off.

Another technique to prevent leakage of molten adhesive back into the dispenser is described in U.S. Pat. No. 4,314,655 to Leibhard et al. In this patent a silicone gasket surrounds the rod prior to the inlet to a melting chamber with an insulator ring placed between the gasket and the inlet. This also would seem to eventually develop an elongate section of solidified melt-back between the rod of adhesive and the inlet leading to the melting chamber particularly each time after the rod drive is turned off.

The adhesive materials, even when they are melted, are quite viscous with a consistency of thick syrup, and thus require a force to extrude melted adhesive from the melting chamber. In typical dispensers this force is provided from a displacement of the melted adhesive by the rod. The rod drive must therefore, overcome the viscosity resistances of the melted adhesive as well as any friction encountered from a solidified melt-back. Since the melted adhesive expands, provisions are commonly also made to retract the rod form the melt chamber when melted adhesive is no longer needed lest excessive dribbling of melted adhesive occurs at the outlet. Rod retraction, however, tends to encourage the formation of solidified melt-back leading to a need to clean and interrupt usage of a dispenser.

Proposals have been made to avoid drip by use of a valve at the outlet of a melting chamber. See, for example, U.S. Pat. Nos. 3,653,552 to Ash; 3,285,475; 3,485,417 to Cocks; and 4,493,972 to Steinel et al. In such devices the melting chamber pressures must still be relieved by either allowing retraction of the rod or permitting a drip in case of excessive pressure lest expansion of the melted adhesive would burst the dispenser.

In some hot-melt dispensers the rod is manually advanced by activation of a trigger. This becomes tiresome to an operator when high resistance is encountered. Substitution of motor activated driven wheels makes the dispenser more bulky and thus more difficult to manipulate and requires good frictional gripping of the rod to push it into the melting chamber. When a lubricant is used on the rod to facilitate its entry into the melting chamber, a frictional drive is made more difficult because the amount of wheel pressure on a rod cannot be made so high lest it causes deformation, which would permit more melt back leading to more friction and then requiring more drive force tending to cause further rod deformation, etc.

When a foamed adhesive is to be dispensed, very high pressures are encountered in the dispenser; see, for example, U.S. Pat. Nos. 4,059,466 and 4,059,714 to Scholl et al and 4,396,529 to Price et al. In such foamed adhesive dispensers, melted adhesive is pumped from a reservoir to a mixing chamber where the molten material is mixed with pressurized air and then discharged as a foam. Such dispenser does not lend itself to a manually held dispenser operation, is difficult to keep clean and requires that all of its operating parts in contact with the material are at a high temperature.

The foaming of thermoplastic materials is well known in the art. In U.S. Pat. Nos. 3,470,113 to Baxman et al. and 4,163,037 to Niznik for example, techniques are described to produce foamable substances using a blowing agent such as Celogen and a polyolefine. The substances are then foamed in a subsequent molding process during which the temperature is sufficiently high to activate the blowing agent. In an article entitled "Crosslinked PE Foam Sheet: New Continuous Process Arrives," published in PLASTICS TECHNOLOGY, of November, 1980 at pages 89-92, raw materials are blended and extruded to form an unblown sheet containing a blowing agent. The unblown sheet can be stored and foamed at a later time in an oven wherein the plastic sheet is passed over jets of hot air. The air crosslinks the material and initiates liberation of the blowing agent while preventing the now soft and tacky sheet from sticking to the conveyor belt. Temperatures are tightly controlled to prevent entrapment of gas in crosslinked closed foam cells.

SUMMARY OF THE INVENTION

With a hot melt dispenser in accordance with the invention a rod of thermoplastic adhesive of indefinite length can be conveniently fed into a dispenser, melted, and manually applied without drip, melt-back or leakage, yet in a reliable manner so that from day to day the same dispenser can be turned on and off and used again.

This is obtained in accordance with one hot-melt dispenser in accordance with the invention by providing a pressurizable melting chamber. The chamber has a movable section with which the volume of the chamber can be expanded and contracted respectively in response to adhesive expansion and its extrusion through a normally closed valve at the chamber outlet. The section is biased to contract to assist in pressurization of the melted adhesive with chamber pressure primarily obtained by keeping the rod of adhesive under compression. Sensing means is employed with the movable section to inhibit feeding of the rod of adhesive into the melting chamber when the section is expanding and enable rod feeding when the section is contracting.

Melt-back of melted adhesive inside the pressurized melting chamber is controlled by feeding the rod of adhesive past a short length seal at an inlet to the chamber and applying cooling means to the immediate vicinity of the seal. The cooling means keeps the temperature of the rod at the seal below its softening point and enables the rod to maintain proper sealing contact with the seal. The cooling means is also effective to establish a short plug of solidified adhesive around the rod, with the plug being sufficiently short so that its frictional contact with the chamber wall does not significantly resist rod entry into the melting chamber.

Melt-back of adhesive is further controlled by the addition of a delay with which the cooling of the seal is maintained for some interval each time the dispenser is turned off. With such delay a cooling gas is kept flowing to the vicinity of the seal after the heater in the dispenser is turned off so that the seal region is protected until the adhesive inside the melting chamber has cooled and solidified.

A hot-melt dispenser in accordance with the invention can be particularly convenient to manually manipulate by feeding the rod from a remote supply spool through a flexible conduit to the inlet of the melting chamber. A rod drive is placed in the vicinity of the supply spool and provides a drive force that does not exceed mechanical properties of the rod such as compressive strength, creep modulus, modulus, compressive recovery rate and impact strength. Yet, sufficient force is available to push the rod through the conduit past the inlet seal into the pressurized melting chamber without deforming the rod. As a result, this leaves the dispenser with only a melting chamber, a heater and thermostat and a lightweight housing support structure that can be easily handled without tiring the operator. Feeding of the rod adhesive occurs automatically and without drip between hot-melt applications.

A foamed hot-melt can be dispensed for improved adherence and less consumption of rod material. This is preferably done in accordance with the invention with an elongate extruded rod of indefinite length of thermoplastic material that incorporates a heat activatable unblown foaming agent for activation inside a dispenser. The rod is fed into the melting chamber where heating and melting of the rod causes the foaming agent to release gas. Because of the use of a normally closed valve at the outlet and the cooled seal at the inlet, the melted adhesive and gas remain entrapped inside the melting chamber at an elevated pressure. When an application of adhesive is desired, the outlet valve is opened, and a foamed adhesive is extruded from the outlet.

It is, therefore, an object of the invention to provide a dispenser of hot-melt adhesives that is convenient to use, either manually or in a fixed position, yet can operate with a high melting chamber pressure, without leakage, to extrude regular or foamed hot melt adhesive. It is a further object of the invention to provide a foamable rod of thermoplastic adhesive and a method for applying a molten foamed adhesive with such rod.

These and other advantages and objects of the invention can be understood from the following detailed description of several embodiments illustrated in the drawings.

DETAILED DESCRIPTION OF DRAWINGS

Figure 1:
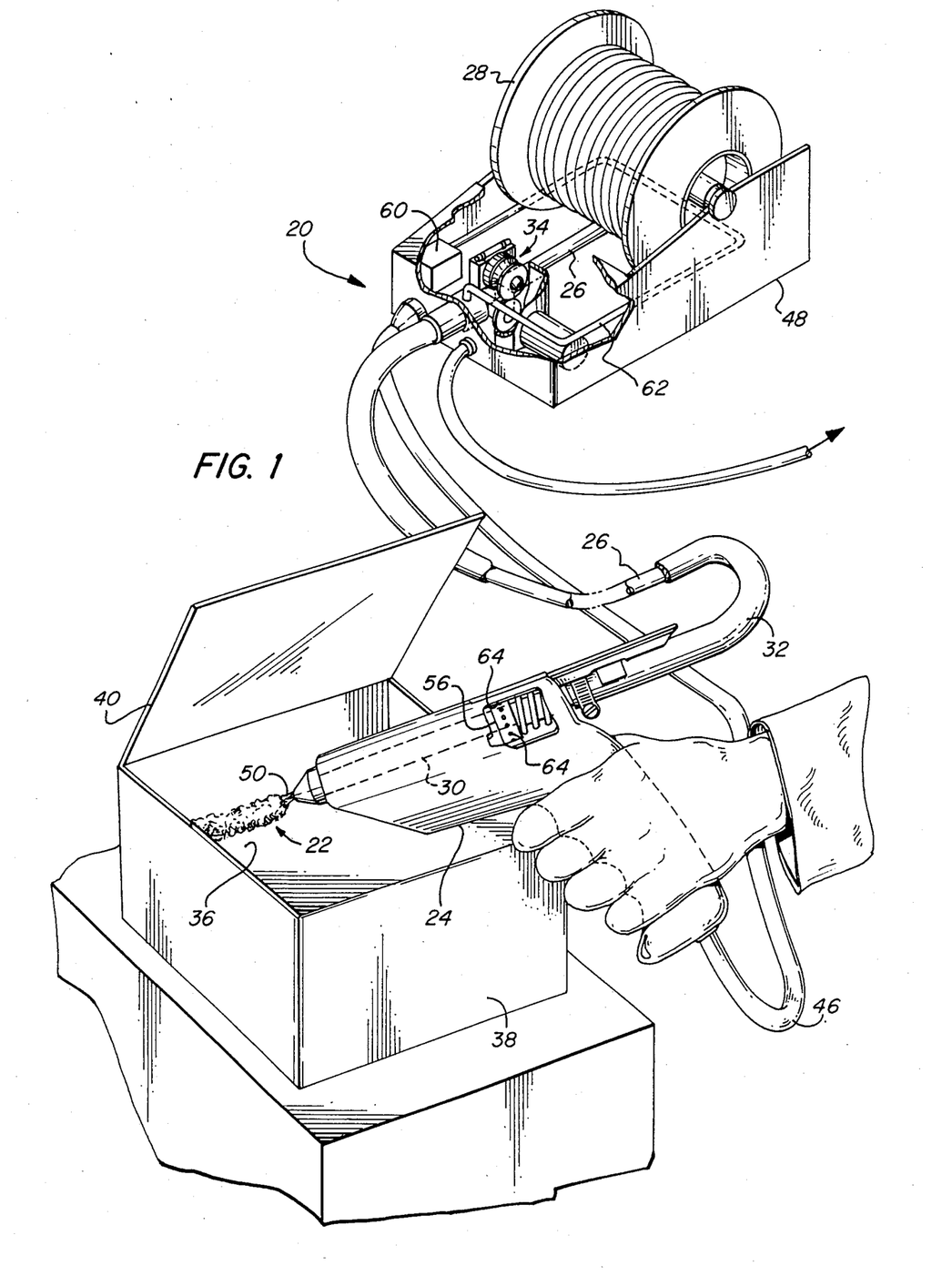
FIG. 1 is a perspective view of an apparatus in accordance with the invention for applying a molten thermoplastic adhesive.

With reference to FIG. 1 an apparatus 20 is shown for dispensing melted thermoplastic material 22 from a manually held dispenser 24. Dispenser 24 is supplied with a cylindrical rod 26 of solidified thermoplastic material wound on a remotely located spool 28. The rod 26 is pushed into a melting chamber 30 through an elongate flexible conduit 32 by a rod drive 34 located in the vicinity of spool 28.

The dispenser 24 is shown in use for applying hot-melt adhesive 22 onto a flap 36 of a cardboard carton 38 so that another flap 40 can be bent over flap 36 and glued to it. It is to be understood that the carton closing shown in FIG. 1 is for illustration only and that apparatus 20 can be used for many different purposes.

Figures 2, 2A, 2B, 3, 9:
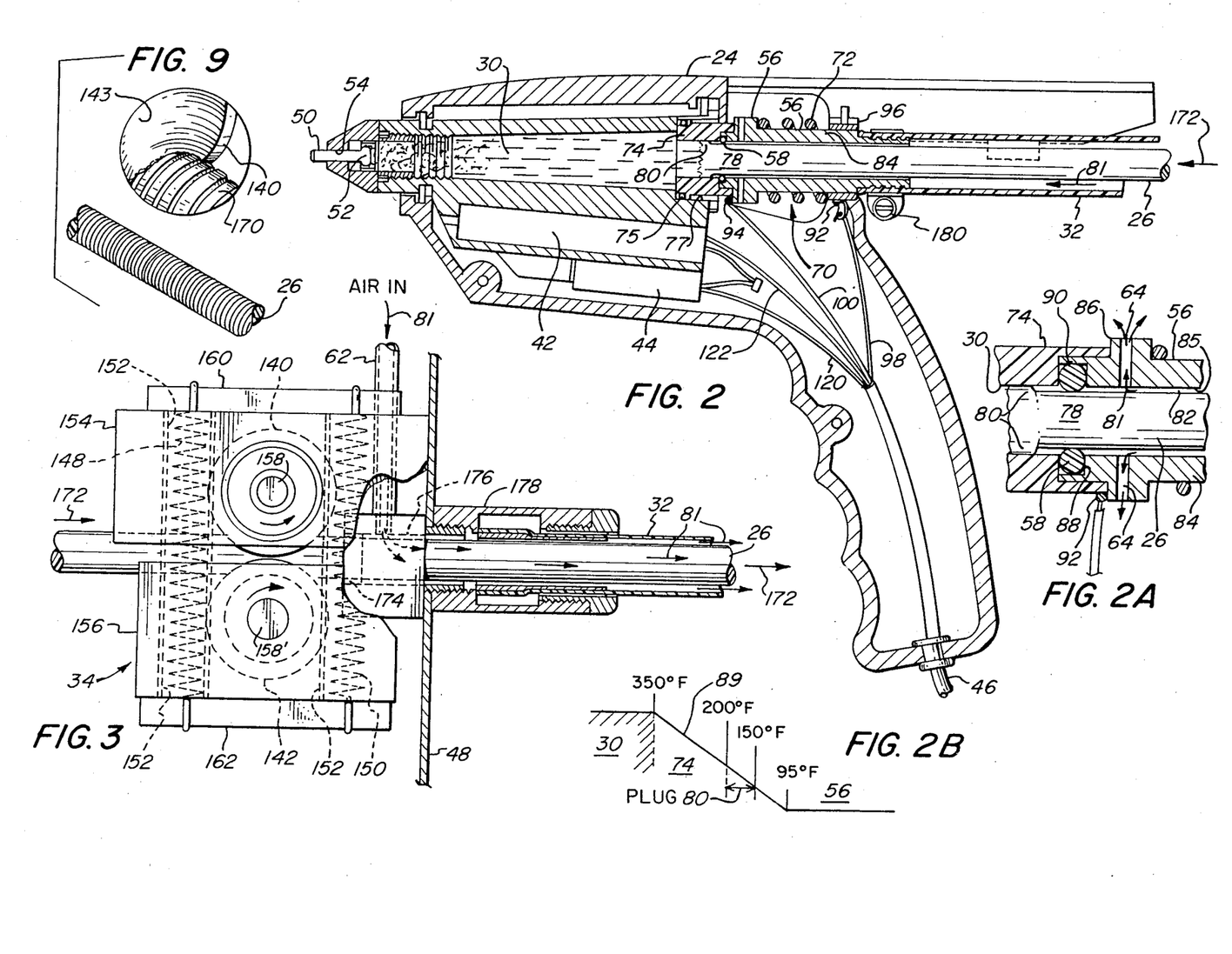
FIG. 2 is cross-sectional view of a hot melt dispenser in accordance with the invention.
FIG. 2A is an enlarged partial section view of the vicinity of a seal used in the dispenser of FIG. 2.
FIG. 2B is diagram of a thermal gradient established in the dispenser of FIG. 2.
FIG. 3 is a vertical sectional view of a rod drive used in the apparatus shown in FIG. 1.
FIG. 9 is an enlarged partial perspective view of an adhesive rod in accordance with the invention.

Dispenser 24 includes a heater 42 and thermostat 44, see FIG. 2, with electrical power and control lines being supplied through a flexible cable 46, see FIG. 1, from a housing 48 that supports spool 28 and rod drive 34. The elongate flexible conduit 32 containing the rod 26 enables the dispenser 24 to be continuously and automatically supplied with adhesive while the dispenser remains lightweight and easy to manipulate without manual controls such as a trigger switch and a manual mechanism to push the rod 26 into the melting chamber 30. The melted adhesive inside chamber 30 is kept at an elevated pressure so that it can be conveniently discharged by extrusion by pushing an exposed stem 50 of a normally closed dobber valve 52, (see FIG. 2) located at the outlet 54 of melting chamber 30, against flap 30 of carton 38.

In order to avoid a melt back of adhesive outside the pressurized chamber 30 a flow of air is supplied to a cooling element 56, see FIG. 1, that is located in the immediate vicinity of a seal 58, FIG. 2. The air flow is obtained from a small compressor 60 (see FIG. 1) in housing 48 and, after passage through a heat removing heat exchanger formed by a copper tube 62, passed through conduit 32 to cooling element 56. Air exits from a plurality of ports 64 to ambient.

With reference to FIG. 2 the chamber 30 is shown provided with a movable section 70 which can expand chamber 30 against the compression of a spring 72. Section 70 includes an insulator 74 having an external O'ring seal 75 that slides along the wall 76 of a counter-bore 77. Insulator 74 preferably is made of a material such as polytetrafluoroethylene and has a length selected so that a high thermal gradient can be established at the inlet 78 to chamber 30 and where seal 58 is located. The thermal gradient enables rod 26 to be kept below its softening temperature, thus retaining its shape and sealing relationship with O'ring seal 58. A relatively short length solidified adhesive plug 80 is maintained around rod 26 and in the vicinity of seal 58. As a result, the force required to push rod 26 into the pressurized melting chamber 30 past seal 58 and the resistance presented by the solidified plug 80 can be sufficiently low so as to avoid excessive rod compression and accompanying deformation. Such deformation can lead to improper sealing with subsequent leakage of melted adhesive.

In the embodiment of FIGS. 2 and 2A, cooling air is supplied through conduit 32 between rod 26 and the internal wall of conduit 32 to heat conductive heat exchange element 56. Air, as suggested by arrows 81, passes along a peripheral channel 82 between rod 26 and a wall 84 of through-bore 85 of element 56 to exit at ports 64 formed in an annular flange 86.

Through-bore 85 terminates at O'ring seal 58 with a counter bore whose end wall 88 and annular side wall 90 are in contact with seal 58 while providing seal support when rod 26 is pushed through as shown. As air is passed through channel 82 and ports 64, a heat exchange occurs which maintains the temperature of walls 88 and 90 and thus seal 58 and its immediate vicinity below the softening temperature of rod 26.

The amount of air flow needed depends upon the amount of heat that needs to be dissipated and the temperature of the air as it reaches the heat exchange element 56. When the air temperature is too high, such as above about 110° F., rod 26 may begin to soften creating a tendency to increase buckling inside conduit 32 and deform as drive 34 attempts to push the buckled rod. The air, therefore, preferably should be below about 100° F. with a flow rate that removes sufficient heat from the seal vicinity so as to establish an approximate thermal gradient curve 89 as illustrated in FIG. 2B across insulator 74.

Curve 89 shows a temperature of about 350° F. at the heat exchanger end of insulator 74. The plug 80 forms between about the 150° F. and 200° F. temperatures, and its length is determined by the thermal gradient and the length of the insulator 74. With an insulator length of about 0.430 inches (11 mm) the length of plug 80 can be limited to about 0.1 inches (2.5 mm) with a rod 26 diameter of 0.375 inches (9.5 mm). Different air flow rates may be used depending upon the temperature in melting chamber 30 and the heat conduction towards the seal region.

The use of heat exchange element 56 that is effective at the face of seal 58 prevents the leakage of melted adhesive upstream of the seal 58 while maintaining plug 80. The length of seal 58 as measured along the direction of feed of rod 26 is preferably kept short, of the order of less than about a quarter of an inch for a 375 inch diameter rod 26.

In the embodiment illustrated in FIGS. 2 and 2A, expansion of adhesive attributable to raising its temperature above the melting point of rod 26 is accommodated by allowing chamber section 70 to move. The amount of volume expansion depends upon the material but usually is about 15% of the volume of chamber 30. Since the feed of rod 26 contributes to the expansion, the drive 34 of rod 26 is inhibited when section 30 begins to expand. A sensor in the form of a switch having contacts 92, 94 is used to sense expansion and contraction movements of section 70. Contact 92 is affixed to a metal retainer ring 96 that is connected to heat exchange element 56 whose flange 86 also serves to retain one end of spring 72. Contact 94 is mounted to housing 24 and is so located that it makes electrical contact with the downstream side of flange 86 of heat exchange element 56 when section 70 is in its fully contracted position. Electrical contact between contacts 92, 94 is thus obtained through retainer ring 96, spring 72 and flange 56. Electrical leads 98, 100 interconnect contacts 92, 94 with the rod drive 34 through cable 46 as illustrated in the schematic of FIG. 7.

Figures 7, 8:
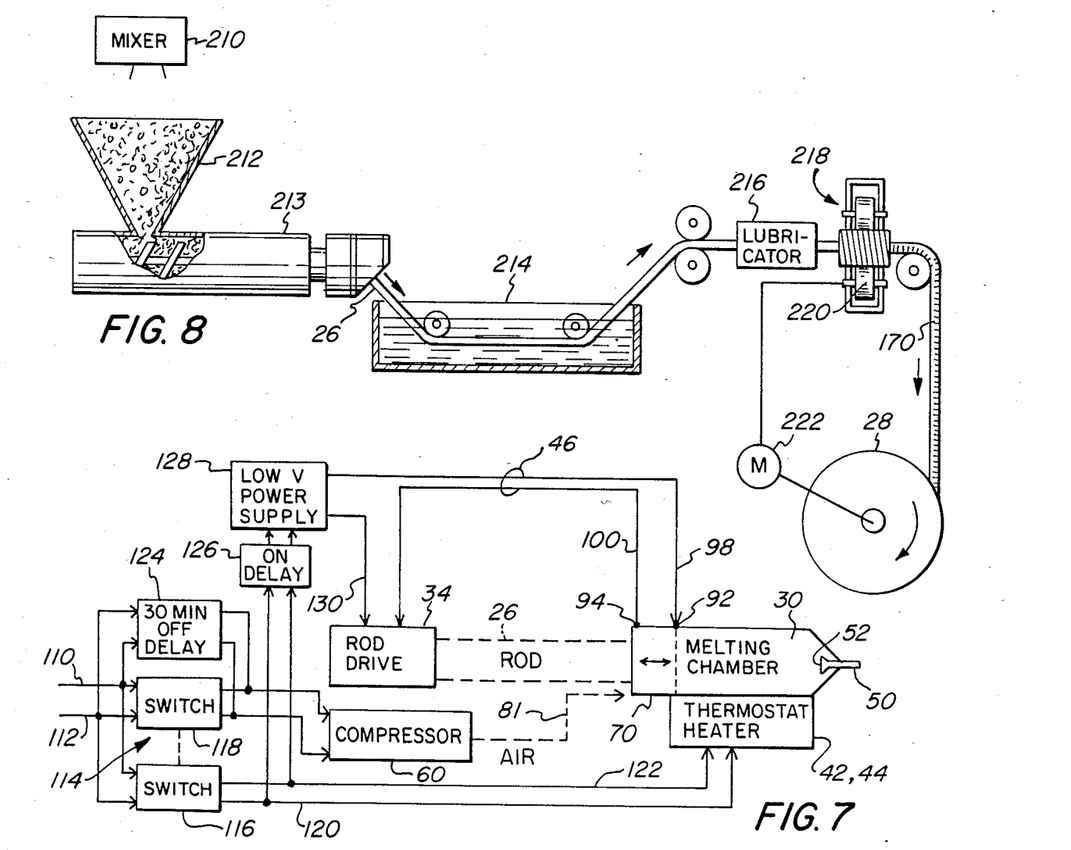
FIG. 7 is a schematic block diagram of an electrical circuit in accordance with the invention and used to operate the dispenser of FIG. 1.
FIG. 8 is schematic view of a technique used to make a rod of adhesive in accordance with the invention.

In FIG. 7 conventional AC power is supplied from input power lines 110, 112, to an on-off switch 114 mounted on remote housing 48 and having two separate switch parts 116, 118. Switch 116 powers heater 42 and thermostat 44 via leads 120, 122. The switch 118 provides electrical power to compressor 60 and is connected in parallel with a turn-off delay 124. This delay assures that, once electrical power is applied to compressor 60, the latter continues to operate for a predetermined interval after switch 114 is turned off.

Electrical power on leads 120, 122 is also applied through a turn-on delay 126 to activate a low voltage power supply 128 connected to leads 98 and 130 to energize rod drive 34. Delay 126 serves to prevent energization of the rod drive 34 before adhesive inside melting chamber 30 has melted. In the embodiment turn-on delay 126 is about one minute, and turn-off delay is about thirty minutes.

The turn-off delay 124 is particularly significant to prevent a melt back of adhesive after the power switch 114 is turned off. In the absence of delay 124, the turn-off of cooling gas 81 would permit the high pressure melted adhesive inside chamber 30 to cause plug 80 to melt, soften rod 26 and force melted adhesive upstream past seal 58 to fill the channel 82. As a result, the dispenser would become useless and require repair. With delay 124, however, the sealing capability of seal 58 is retained for a sufficiently long time to enable melted adhesive inside chamber 30 to cool and solidify without melt back.

Figure 4:
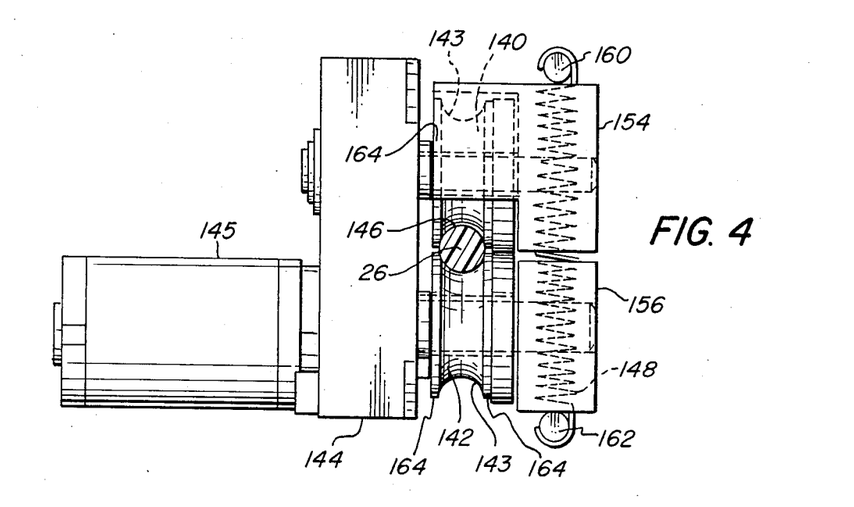
FIG. 4 is a front end view in elevation of the rod drive shown in FIG. 3.

The rod drive 34, as shown in FIGS. 3 and 4 is a friction drive obtained with a pair of drive wheels 140, 142, each of which is connected by suitable gears in a housing 144 to an electric motor 145. The drive wheels 140, 142 have peripheral drive surfaces 143 shaped as shown in FIGS. 4 and 9 to conform to the cylindrical surface 146 of rod 26. Each drive wheel 140, 142 is mounted with moveable centers relative to rod 26 so that springs 148, 150 can provide adequate clamping pressure of wheels 140, 142 on to rod 26 but without producing creep during standby. Springs 148, 150 fit through bores 152, in blocks 154, 156 which are journalled on shafts 158, 158' of wheels 140, 142 respectively. Springs 148, 150 engage clamping rods 160, 162 to press blocks 154, 156 and thus wheels 140, 142 towards the adhesive rod 26. Peripheral edges 164 on wheels 140, 142 are provided to maintain sufficient separation of the wheels 140, 142 to insert a rod 26.

Wheels 140, 142 may be rigid such as when they are formed of aluminum with roughened drive surfaces to enable to grip rod 26 and drive it through flexible conduit 32 into melting chamber 30. In such case care must be taken that the compressive clamping force is sufficient to move but not deform rod 26. Any indentation of rod 26 should recover before it reaches the seal 58.

Wheels 140, 142 preferably are made of a resilient material in which case they may be on fixed centers. The resilience may vary but preferably is in the range on the durometer scale from about 30 to about 60. With resilient wheels 140, 142 good drive characteristics are obtained with a rod 26 as shown in FIG. 9. In this Figure rod 26 carries closely spaced annular grooves 169 which separate annular embossments 170. These embossments are preferably closely spaced so that their presence does not interfere with the effectiveness of seal 58 as the rod 26 is pushed through inlet 78 by drive wheels 140, 142, yet are sufficiently spaced apart to enable the wheels to firmly grip rod 26. Embossments 170 may be in the form of a screw thread pressed onto rod 26 during its manufacture.

The feed of rod 26 is in the direction indicated by arrow 172 in FIG. 3. The rod 26 passes past an air seal 174 into a tube 176 leading to a first conduit termination 178 and round conduit 32. Conduit 32 may be of substantial length sufficient to facillitate manual handling of dispenser 24. Since the conduit presents friction to the passage of adhesive rod 26, the conduit should not be too long. A conduit length of from 6 to 10 feet has been found satisfactory without demanding a rod-deforming drive force from rod drive 34.

The internal diameter of conduit 32 should be smooth walled and sufficiently large to enable adhesive rod 26 to pass through with sufficient clearance to enable air to move through the conduit to the seal 58. The conduit should not be so large in diameter as to permit buckling of rod 26. For an adhesive rod 26 of 0.375 inches diameter (7.5 mm), an internal conduit diameter of 0.441 inches (11.2 mm) with a conduit tubing made of Teflon (Dupont trademark) has been found satisfactory.

The other end of conduit 32 is affixed to dispenser 24 with a second termination in the form of a conventional hose clamp 180. The connection of conduit 32 to tube 176 and dispenser 24 may employ different devices as are well known in the art.

The forces resisting the advance of adhesive rod 26 into the melting chamber arise from the high pressure inside the melting chamber, friction from the plug 80, seal 58 and conduit 32, and the air seal 174. In order to keep the drive force from rod drive 34 below the compressive strength of adhesive rod 26 it is lubricated with a thin film lubricant. The lubricant should be of a material that will not adversely affect the properties of the rod 26 throughout its shelf life. One such lubricant is silicone grease that is applied as a thin, approaching monocellular, layer.

Although the compression of rod 26 is kept below its breaking point, breakage may still arise. In such case the broken facing ends are reworked to produce interfitting convex and concave surfaces that align and pass through conduit 32 and seal 58 without jamming.

Figure 5A:
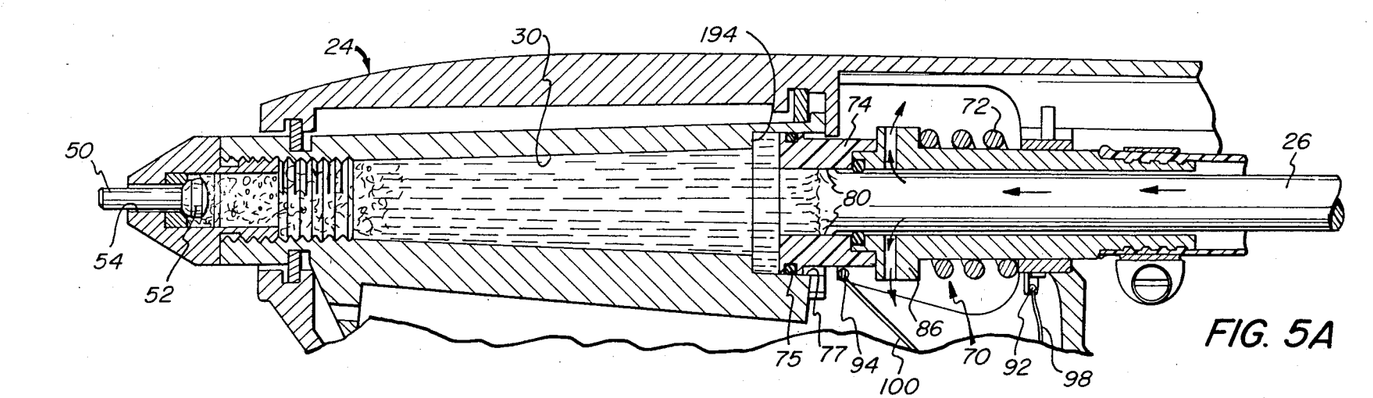
FIGS. 5 and 6 are partial vertical sectional views of a dispenser in accordance with the invention showing the apparatus in different operational positions.
Figures 5B, 6:
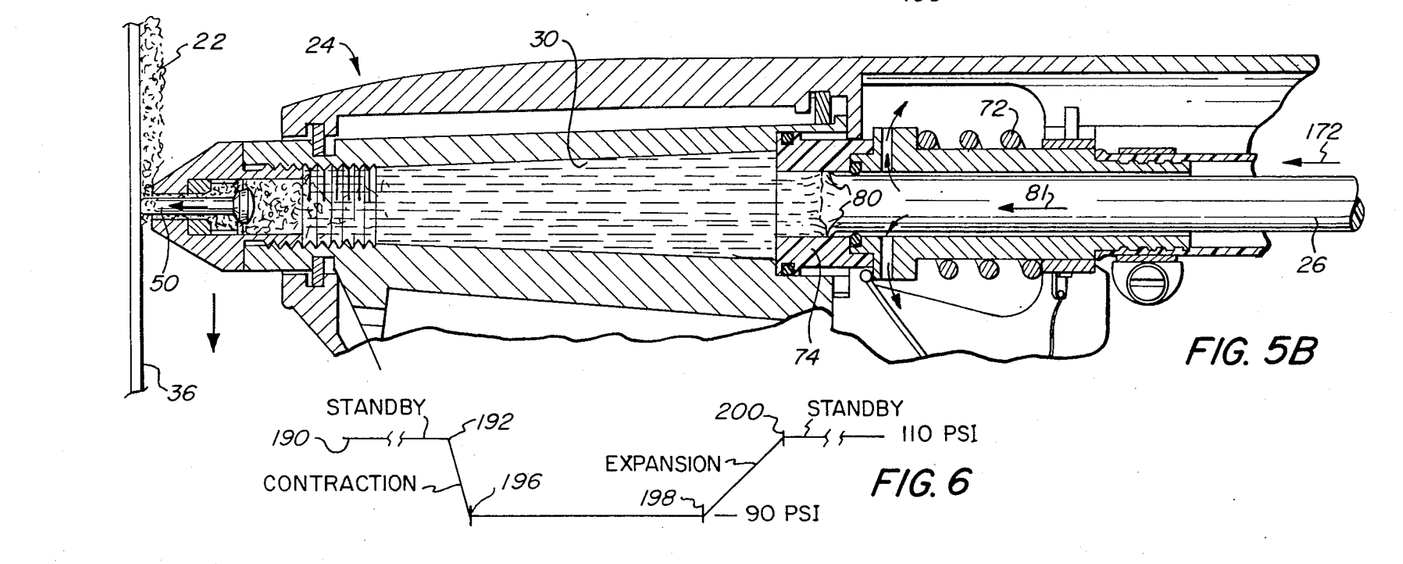

Operation of dispenser 24 can be understood with reference to FIGS. 5A, 5B and 6. At 190 in FIG. 6 dispenser 24 is in a standby condition with melted adhesive filling chamber 30 at a high pressure, about 110 psi, as shown in FIG. 5A. The melted adhesive is prevented from being extruded from the outlet 54 by normally closed valve 52. Chamber pressure arises from the relatively fixed position of rod 26 and the spring 72 which is shown compressed by virtue of the expansion movement of section 70. The feed of rod 26 is disabled as a result of the separation of contact 94 from heat exchange flange 86. During standby the rod is held in position by virtue of the resistances presented by plug 80, seal 58 and the friction between rod 26 and conduit 32.

At 192 in FIG. 6 the application of adhesive is begun by pushing stem 50 against the surface 36 to which an adhesive is to be applied. This opens outlet 54 enabling melted adhesive 22 to be extruded through outlet 54 as a result of the pressurized melting chamber 30. In the preferred embodiment, the adhesive rod 26 includes an unblown foaming agent that is activated by the high temperature in chamber 30. Hence, a foamed adhesive 22 is extruded and section 70 commences to contract against a lowering pressure in chamber 30 as shown in FIG. 5B until the insulator 74 of section 70 bottoms out against the seating surface 194 in the melting chamber 30, corresponding to 196 in FIG. 6. At 196 the chamber 30 has a pressure of the order of about 90 psi.

As long as adhesive is permitted to be extruded, section 70 remains in its contracted position, and fresh adhesive rod continues to be pushed into chamber 30 by rod drive 34. However, when dispenser 24 is moved away from surface 36 as at 198 in FIG. 6, valve 52 is pushed closed by the high pressure melted adhesive in chamber 30 and an expansion of the melted adhesive begins a corresponding expansion movement of section 70. This continues util again a standby condition arises at 200.

During this time the operator needs to only focus on the application of adhesive. A trigger to actuate the dispenser 24 can be eliminated and fresh rod material is automatically supplied.

Pressurization of melting chamber 30 may vary, but should be sufficiently high to enable melted adhesive to be self-extruded from outlet 54. The pressure should not be so high as to produce too high a resistance force on the portion of the rod 26 inside chamber 30. Such high resistance would make it difficult for rod drive 34 to push rod 26 through hose 32 past seal 58 into the chamber. The chamber pressurization should be within the range from about 40 psi to about 150 psi and preferably operates as illustrated in FIG. 6 from about 90 to about 110 psi. At such pressures a foamable melted adhesive inside the chamber does not foam; but as soon as it is extruded from the chamber 30, a foam is produced.

A foamable rod of adhesive may be formed in a manner as illustrated in FIG. 8. Small pellets of a thermoplastic adhesive are mixed with a powdery blowing agent in a mixer 210. The blowing agent releases a gas, such as nitrogen, when it is raised above a particular temperature. The amount of blowing agent may be varied depending upon the desired volumetric change of the adhesive rod when it is extruded from outlet 54. Generally the amount of blowing agent to be used should be in a range where the foamed volume is from about one to ten times the volume of the melted rod. Satisfactory foaming and subsequent adhesion of carton flaps has been obtained with about one percent by weight of a blowing agent, known as Celogen.

The powder covered pellets are then placed in a hopper 212 leading to a heated screw extruder 213. The temperature of the extruder is kept below the activation temperature of the blowing agent yet is sufficiently high to enable extrusion of the pellets to form rod 26. In the case of the Celogen blowing agent, which has a blowing temperature range from about 200° F. to about 270° F., the extruder temperature is kept between about 150° F. and 200° F. and preferably about 175° F.

Extrusion of rod 26 is done with great care to maintain a desired degree of roundness as well as maintain the diameter of rod 26 within a particular tolerance. Typically for a 0.375 inch diameter rod its diameter variations are held within about ±0.010 inches. This assures the maintenance of a good seal contact with seal O'ring 58 in dispenser 24.

After extrusion the rod 26 is is passed through a cooling bath 214 to stiffen rod 26. After cooling, the rod is passed through a lubricator 216 which places a thin film of silicone grease over the entire outside surface of rod 26.

The rod is then passed through an embosser 218 which forms a screw thread 170 on the surface of rod 26. The embosser 218 may be a nut 220 with an internal screw thread and that is driven into rotation around rod 26 by a motor 222 that also drives take-up spool 28. The speed of nut 220 is coordinated with the take-up of rod 26 by spool 28.

Figures 10, 11, 12:
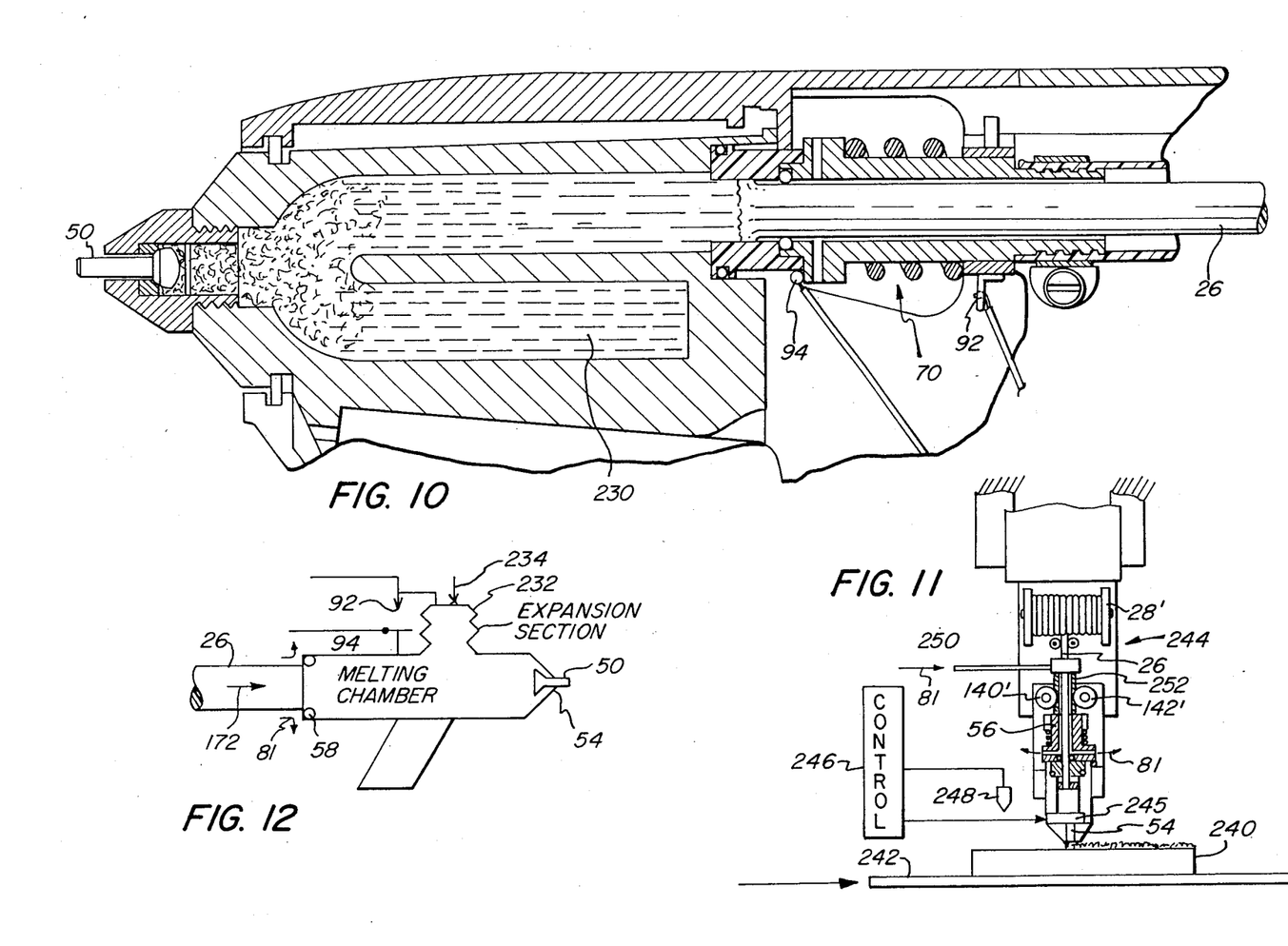
FIG. 10 is a partial vertical section view of an alternate form for a hot-melt adhesive dispenser in accordance with the invention.
FIG. 11 is a front view in elevation of a stationary dispenser in accordance with the invention.
FIG. 12 is a schematic representation of another form for a hot-melt dispenser in accordance with the invention.

The pressurization of dispenser 24 can be conveniently used to provide an enlarged U-shaped melting chamber such as 230 shown in FIG. 10. The enlargement provides additional melted adhesive to approach continuous operation for many applications. Note that with a larger melting chamber 230, a correspondingly greater amount of expansion by section 70 may be needed.

The expansion section 70 need not be located as shown in FIGS. 2 and 10 but could be placed as shown in FIG. 12. In this embodiment a movable section 232 is placed on top of the dispenser. A spring, as suggested by arrow 234, urges the section towards a contracted position, and contacts 92 and 94 are used with section 232 in the manner as previously described with reference to FIG. 2 to control the feed of adhesive rod 26.

The dispenser 24 and adhesive rod 26 may also be used in a stationary position as shown in FIG. 11 for example, for use along an assembly line where workpieces 240 are moved by a conveyer 242 past dispenser 244. In this embodiment, dispenser 244 has a remotely activatable outlet valve 245 that is opened for an interval by a control 246 a short time after a sensor 248 detects a workpiece 240. In the FIG. 11 an elongate conduit between spool 281 and dispenser 244 can be dispensed with and in such case cooling air for seal 58 is supplied through tubes 250, 252 to the the heat exhanger 56.

Having thus described the invention in greater detail, its advantages can be appreciated. A foamable rod of adhesive of indefinite length can be conveniently used either through a manually handled dispenser or through a stationary dispenser to deposit a foamed adhesive. Variations from the described embodiments can be made without departing from the scope of the invention. For example, passive, but bulky, heat exchanger elements could be used instead of cooling air. Cooling air need not be supplied through conduit 32 but may be applied by way of a separate tube.

What is claimed is:

1. An apparatus for dispensing a hot melt such as a molten adhesive obtained from a solid form such as a rod stored on a spool, comprising:

manually held dispenser means having an outlet for dispensing melted adhesive and having an inlet to receive the rod, said dispenser means having heating means to heat the rod entered into the dispenser through the inlet and having means for normally closing the outlet and enable a pressurization of molten adhesive inside the dispenser means;

flexible conduit means extending from the vicinity of the spool to the inlet of the dispenser; and drive means in the vicinity of the spool for pushing the rod through the conduit means into the inlet of the dispenser means;

sealing means at inlet and through and in contact with which the rod is pushed into the dispenser means for preventing the escape of molten adhesive from inside the dispenser means;

cooling means, located in heat exchange relationship with the vicinity of the sealing means, to remove heat from the sealing means so as to maintain the temperature of the rod, at the sealing means below the softening temperature of the rod and to retain the shape of the rod and its sealing contact with the seal with a sufficiently short length of solidified adhesive plug between the sealing means and the inside of the dispenser means so that the drive means can push the rod through the conduit means into the dispenser means.

2. The apparatus for dispensing a molten adhesive as claimed in claim 1 wherein the dispenser means further includes a melting chamber having a movable section so as to be able to expand and contract the chamber, and means for urging the section towards contraction wherein said sealing means is mounted in the moveable section to move therewith and the rod as it is introduced into the dispenser means through said sealing means.

3. The apparatus for dispensing a molten adhesive as claimed in claim 2 wherein the dispenser means further includes:
means for inhibiting the drive means when said movable section expands and enabling the drive means when the section contracts.

4. The apparatus for dispensing a molten adhesive as claimed in claim 3 wherein the sealing means is formed with an O'ring sized to sealingly engage the rod and the surrounding movable section of the melting chamber.

5. The apparatus for dispensing a molten adhesive as claimed in claim 4 wherein the means for normally closing the outlet comprises:
a valve having a valve element and valve seat facing the melting chamber and located to receive the valve element, which has a stem extending through the outlet to protrude from the dispensing means for opening the valve.

6. The apparatus for dispensing a molten adhesive as claimed in claim 5 wherein the movable section includes:
an insulator having a through bore sized to receive the rod and movably and sealingly mounted to the dispenser means, and
wherein the rear of said insulator has a counter bore shaped to receive the O'ring and
wherein the cooling means is in direct heat exchange relationship with the O'ring.

7. The apparatus for dispensing a molten adhesive as claimed in claim 2 wherein the cooling means includes:
gas supplying means to supply gas to the vicinity of the sealing means through the conduit means.

8. The apparatus for dispensing a molten adhesive as claimed in claim 7 and further including an insulator located downstream of the sealing means and having a length selected to maintain a short length plug of solidified adhesive.

9. The apparatus for dispensing a molten adhesive as claimed in claim 7 and further including:
a heat exchanger operatively located between the gas supplying means and the conduit means to remove sufficient heat from the gas flow to lower its temperature to operate the cooling means.

10. The apparatus for dispensing a molten adhesive as claimed in claim 1 wherein the drive means includes:
a pair of rollers shaped to engage a rod at opposite sides thereof, said rollers being formed of a resilient material having a hardness on the durometer scale in the range of from about 30 to about 60, and positioned so as to be in frictional driving contact with the rod.

11. The apparatus for dispensing a molten adhesive as claimed in claim 1 wherein the drive means includes:
a pair of rollers shaped to engage a rod at opposite sides thereof, said rollers being formed of a metal having a roughened rod-gripping surface, and means for urging the rollers into driving frictional contact with the rod with a force sufficient to be able to push the rod into the dispenser means without deforming the rod.

12. The apparatus as claimed in claim 1 and further including:
an elongate rod of meltable adhesive incorporating a heat activatable unblown foaming agent for activation inside the dispenser means to form a foamed melted adhesive from the outlet when the valve means is opened.

13. The apparatus as claimed in claim 12 wherein the elongate rod is provided with a lubricant on its outer surface.

14. The apparatus as claimed in claim 13 wherein the elongate rod of adhesive is provided with annular embossments to enhance frictional contact between the rod and the drive means.

15. An apparatus for dispensing a molten adhesive obtained from a solid form such as a rod stored in a spool comprising:
dispenser means having heating means to melt the rod and having an inlet shaped to receive the rod and having an outlet for dispensing adhesive melted from the rod;
drive means for pushing the rod into the inlet;
sealing means at said inlet and through which the rod is pushed into the dispenser means for preventing leakage of molten adhesive from inside the dispenser means past the rod;
means for supplying a flow of cooling gas to the vicinity of the sealing means; and
cooling means located in heat exchange relationship with the vicinity of the sealing means and responsive to the flow of gas for removing sufficient heat from the sealing means vicinity so as to maintain the temperature of the rod below its softening temperature to retain the shape of the rod and its sealing contact with the sealing means with a sufficiently short length of solidified adhesive plug inside the dispenser means so that the drive means can push the rod into the dispenser means without deformation of the rod prior to its passage past the seal.

16. The apparatus for dispensing a molten adhesive as claimed in claim 15 wherein the dispenser means includes:
a melting chamber having a movable section so that the volume of the chamber is expandable and contractable, with said movable section being biased towards contraction of the chamber volume.

17. The apparatus for dispensing a molten adhesive as claimed in claim 16 wherein the dispenser means further includes:
means for urging the movable section towards contraction to pressurize melted adhesive inside the chamber.

18. The apparatus for dispensing a molten adhesive as claimed in claim 17 wherein the sealing means is operatively disposed within the movable section to move therewith.

19. The apparatus for dispensing a molten adhesive as claimed in claim 16 and further including:
spring means for urging the movable section to contract; and
means for inhibiting the drive means when the movable section expands and enabling the drive means when the movable section contracts.

20. The apparatus for dispensing a molten adhesive as claimed in claim 15 wherein the length of the seal as measured along the travel path of a rod is less than about a quarter of an inch.

21. The apparatus for dispensing a molten adhesive as claimed in claim 20 wherein the sealing means comprises an O'ring.

22. The apparatus for dispensing a molten adhesive as claimed in claim 15 wherein the dispenser means further includes a normally closed valve at the outlet to enable pressurization of the molten adhesive.

23. The apparatus for dispensing a molten adhesive as claimed in claim 22 and further including:
means for maintaining the flow of gas for a time interval after said dispenser means no longer is activated to melt the rod of adhesive and with said interval being sufficiently long to maintain the shape of the rod at the sealing means until molten adhesive inside the dispenser means has solidified.

24. The apparatus as claimed in claim 15 and further including:
an elongate rod of meltable adhesive incorporating a heat activatable unblown foaming agent for activation inside the dispenser means for forming a foamed melted adhesive from the outlet when the valve means is opened.

25. The apparatus for dispensing a molten adhesive as claimed in claim 15 and further including
an elongate rod of meltable adhesive and having annular embossments thereon along the length of the rod.

26. The apparatus for dispensing a molten adhesive as claimed in claim 25 wherein the embossments are in the form of a screw thread.

27. An apparatus for dispensing a melted adhesive obtained from a solid form such as a rod, comprising:
a housing having, an unobstructed inlet to receive a rod, a melting chamber in communication with the inlet, means for heating the chamber to melt a rod entered through the inlet, an outlet from which melted adhesive from the chamber is dispensed, normally closed valve means at said outlet to enable pressurization of melted adhesive inside the chamber, said chamber having an expandable and contractable section, a seal at said inlet to seal around the rod, means for urging the chamber section to contract, sensing means operatively located with respect to the chamber section so as to inhibit feeding of the rod into the chamber in response to an expansion of the section and enable feeding of the rod in response to a contraction of the section, and means for controlling the temperature at the seal to maintain the effectiveness of the seal around the rod while forming a short plug of solidified adhesive between the seal and the melting chamber so as to enable a feeding of the rod into the chamber within deforming the rod; and
drive means responsive to the sensing means to push the rod into the inlet.

28. The apparatus as claimed in claim 27 and further including:
an elongate flexible conduit located between the housing inlet and the drive means, said drive means being remotely located with respect to the housing so as to push the rod through the conduit into said inlet.

29. The apparatus as claimed in claim 28 wherein the temperature controlling means comprises air flow producing means to deliver air to the vicinity of the seal through the conduit.

30. The apparatus as claimed in claim 21 wherein the temperature controlling means includes:
means for producing a flow of air to the vicinity of the seal, and
cooling means at the seal and responsive to the flow of gas to remove a sufficient amount of heat from the vicinity of the seal so as to maintain the temperature of the rod opposite the seal below the softening temperature of the rod to retain its shape and sealing contact with the seal while enabling the drive means to push the rod through the conduit into the pressurized melting chamber without deforming the rod.

31. The apparatus as claimed in claim 30 wherein the rod comprises:
an elongate rod of meltable adhesive incorporating a heat activatable unblown foaming agent for activation inside the melting chamber for forming a foamed melted adhesive from the outlet when the valve means is opened.

32. The apparatus as claimed in claim 27 wherein the melting chamber is U-shaped.

* * * * *